United States Patent [19]
Miki et al.

[11] Patent Number: 5,868,167
[45] Date of Patent: Feb. 9, 1999

[54] PRESSURE REGULATING VALVE IN A HYDRAULIC CONTROL SYSTEM FOR AN AUTOMATIC TRANSMISSION

[75] Inventors: Nobuaki Miki, Kariya; Takenori Kano, Toyota; Haruki Yamamoto, Gamagori, all of Japan

[73] Assignee: Aisin AW Co., Ltd., Japan

[21] Appl. No.: 774,549

[22] Filed: Dec. 30, 1996

[30] Foreign Application Priority Data

Dec. 30, 1995 [JP] Japan ................................. 7-352473

[51] Int. Cl.$^6$ ................................. F15B 13/044
[52] U.S. Cl. ................................. 137/625.65; 251/129.16
[58] Field of Search .............. 137/625.65; 251/129.16

[56] References Cited

U.S. PATENT DOCUMENTS

| | | | |
|---|---|---|---|
| 4,971,116 | 11/1990 | Suzuki et al. | 137/625.65 |
| 5,197,507 | 3/1993 | Miki et al. | 137/625.65 |
| 5,259,414 | 11/1993 | Suzuki | 137/625.65 |

*Primary Examiner*—Gerald A. Michalsky
*Attorney, Agent, or Firm*—Lorusso & Loud

[57] ABSTRACT

A pressure regulating valve in a hydraulic control system for an automatic transmission according including a pressure regulating unit having a spool made slidable in a valve sleeve 10. An electromagnetic unit for causing a hollow core (or stator) is provided to attract a plunger (or movable element) arranged on a push rod communicating with the spool. The spool is moved by a spool moving mechanism in a direction to increase the flow from an input port to an output port to thereby raise an output pressure from an output port when the output pressure is lowered by a leakage. The spool position is controlled to control the output pressure in accordance with a balance among a spring force of spring means fitted in the valve sleeve, a feedback force resulting from the output pressure, and an electromagnetic attraction to be established in response to an electric signal provided to the electromagnetic unit having the hollow core and the plunger. In another embodiment, an input pressure feedback port is provided in the valve sleeve, and spool position control is additionally dependent upon an input pressure feedback force provided to the input pressure feedback port.

8 Claims, 19 Drawing Sheets

PRESSURE REGULATING VALVE IN A HYDRAULIC CONTROL SYSTEM FOR AN AUTOMATIC TRANSMISSION

BACKGROUND OF THE INVENTION

1. Field of the Invention

The present invention relates to a pressure regulating valve, and, more particularly, to a pressure regulating valve in a hydraulic control system for an automatic transmission which raises output pressure responsive to output pressure leakage.

2. Related Art

In a prior art pressure regulating valve for an automatic transmission hydraulic control system, as shown in FIG. 20, a spool S is controlled to control an output pressure by taking a balance among a spring force of spring means B, a feedback force resulting from an output pressure, and an electromagnetic attraction established in response to an electric signal input to an electromagnetic unit R. The controlled output pressure is fed to a change-over valve and a regulator valve to control the application/release of a clutch or a brake.

The leakage of oil from the clearances between the spools and valve bodies of a change-over valve and a regulator valve, for example, is increased as a result of thermal expansion and other changes in the pressure medium (or oil). As a result, the output pressure of the linear solenoid is lowered, and shift shock is created at the time of applying/releasing the clutch or brake.

As a method of raising the output pressure of the regulator valve, therefore, it is conceivable to increase the valve diameter and accordingly the displacement. This concept raises a problem in that the space for mounting the regulator valve has to be enlarged. Another approach would be to reduce the size of, or omit, each valve to which the output pressure is applied from the regulator valve, or to lower the control pressure for the clutch or brake. However, either concept is technically or practically difficult to execute.

There is, therefore, a need in the art for a compact, simple and cost-effective design for a pressure regulating valve for automatic transmission hydraulic control systems which automatically increases output pressure in response to leakage.

SUMMARY OF THE INVENTION

Accordingly, it is an object of the present invention to provide a pressure regulating valve in a hydraulic control system for an automatic transmission which automatically compensates for output pressure leakage to reduce shift shock.

A further object of the present invention is to provide a pressure regulating valve in a hydraulic control system for an automatic transmission which compensates for output pressure leakage, but does not require improvement of other system devices or an increase in size relative to prior art valves.

These and other objects of the invention will become apparent from a review of the description provided below.

The pressure regulating valve according to the invention controls a spool to control an output pressure by balancing a spring force of spring means fitted in a valve sleeve, a feedback force resulting from the output pressure to be outputted from an output port, and an electromagnetic attraction to be established according to an electric signal input to an electromagnetic unit having a stator and a movable element. A spool moving mechanism controls the spool to raise the output pressure when the output pressure is lowered by a leakage, thereby eliminating shift shock and other problems caused by drops in output pressure.

In a first embodiment of the present invention, the spool moving mechanism moves the spool in a direction to increase the flow from an input port to the output port when the output pressure is lowered by leakage. The spool moving mechanism includes attraction means having a stator which attracts a movable element. The attraction means equalizes a rate of change of the electromagnetic attraction between the stator and the movable element accompanying the movement of the spool to the rate of change of the force provided by the spring means accompanying the movement of the spool.

In a second embodiment of the invention, the spool moving mechanism includes the spring means having non-linear characteristics. The spring means is set to have a large spring constant when the spring deflection is no more than a constant value, and a small spring constant when the deflection is no less than the constant value. The spring means thus allows movement of the spool in accordance with non-linear characteristics to increase the flow from the input port to the output port when the output pressure is lowered by leakage.

In a third embodiment of the invention, the spool moving mechanism includes input pressure moving means having: an input pressure feedback port formed in the valve sleeve; and a smaller-diameter stepped portion formed in the spool at a position corresponding to the input pressure feedback port. The pressure fed to the input port flows into the input pressure feedback port, and moves the spool by making use of the input pressure feedback force resulting from the input pressure. The spool position is controlled to control the output pressure by balancing the spring force, the input pressure feedback force, the output pressure feedback force, and the electromagnetic attraction.

BRIEF DESCRIPTION OF THE DRAWINGS

Preferred embodiments of the invention are described below with reference to the following figures wherein like numerals represent like parts.

DESCRIPTION OF THE PREFERRED EMBODIMENTS

Preferred embodiments of the present invention will now be described with reference to the accompanying drawings.

Figure 1:
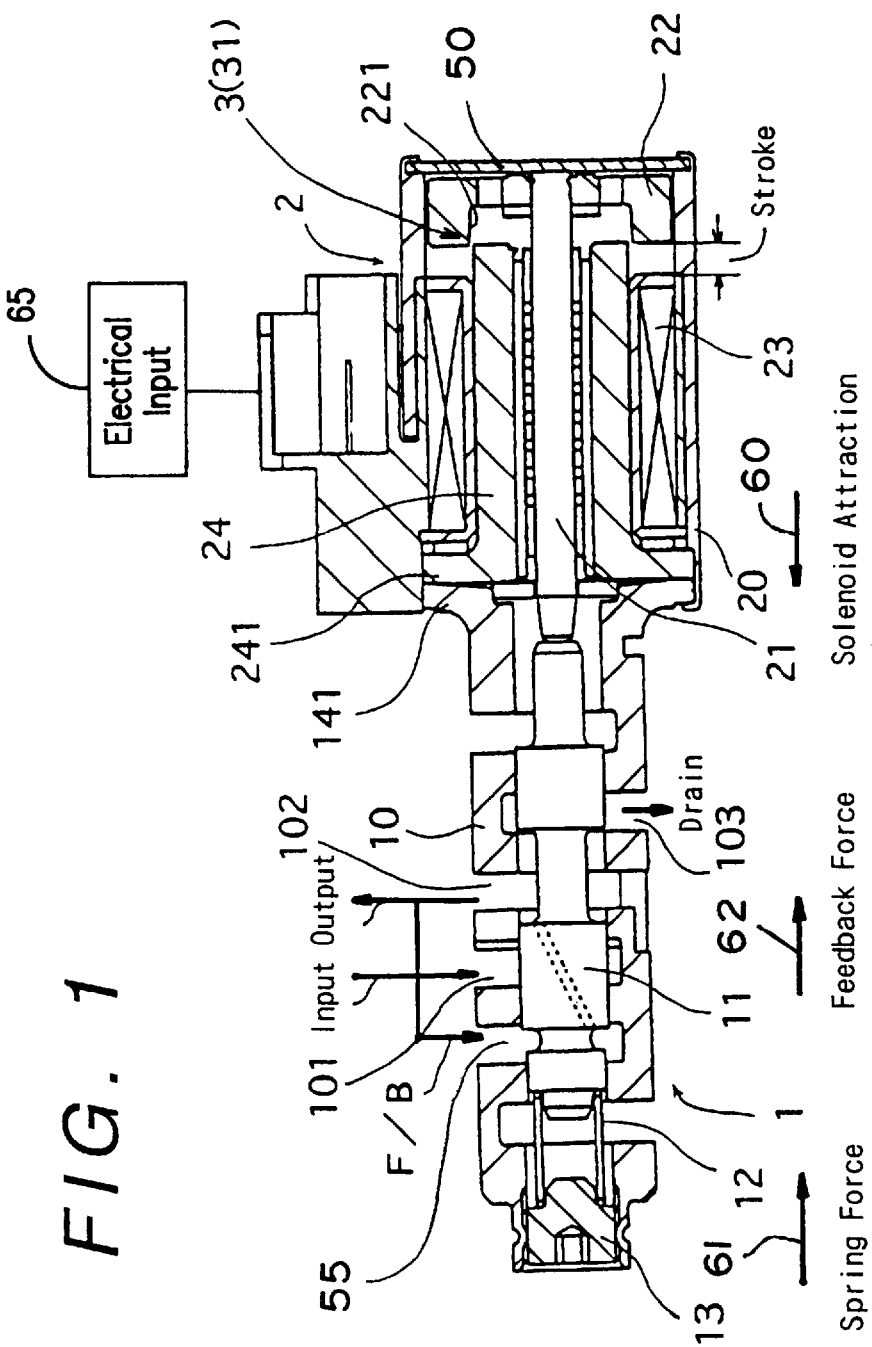
FIG. 1 is a side sectional view showing a pressure regulating valve according to a first embodiment of the present invention.

A first embodiment of a pressure regulating valve according to the invention is shown in FIGS. 1 to 8. With reference to FIG. 1, the valve includes a pressure regulating unit 1 having a spool 11 made slidable in a valve sleeve 10. Communicating with the spool 11 is a push rod 21 of an electromagnetic unit 2. The electromagnetic unit 2 includes a spool moving mechanism 3 which includes a hollow core (or stator) 24 for attracting a plunger (or movable element) 22 arranged on the push rod. Responsive to a change in output pressure due to leakage, the spool moving mechanism moves the spool in a direction to increase the flow from an input port 101 to an output port 102 thereby raising an output pressure.

The pressure regulating unit 1 includes a valve sleeve 10 having an input port 101 to be fed with an input pressure, an output port 102 for feeding regulated output pressure, an output pressure feedback port 55 for receiving regulated output pressure, and an exhaust port 103 for discharging pressure oil. The spool 11 is slidably positioned in the valve sleeve 10, and a spring 12 is mounted between a receiving plug 13 fitted in the valve sleeve 10 and the spool 11 for urging the spool 11 rightward of the drawing. The pressure regulating unit 1, thus constructed, regulates feed pressure from the output part 102 in accordance with an electric input 65 to a coil 23, by balancing the load according to the electric signal in the direction of arrow 60, the load by the spring 12 in the direction of arrow 61, and the output pressure feedback load in the direction of arrow 62.

As shown in FIG. 1, the electromagnetic unit 2 includes: the hollow core 24 fitted in a cylindrical case 20 having a circular cover 50 retained at its one end opening. The coil 23 is positioned coaxially with the hollow core 24. The hollow core 24 and the valve sleeve 10 are hollow members having a generally T-shaped longitudinal sections. The core 24 is integrally caulked at one axial end of the case 20 such that a larger-diameter end 241 of the core is in axial abutment against a larger-diameter end portion 141 of the valve sleeve 10.

Figure 8:
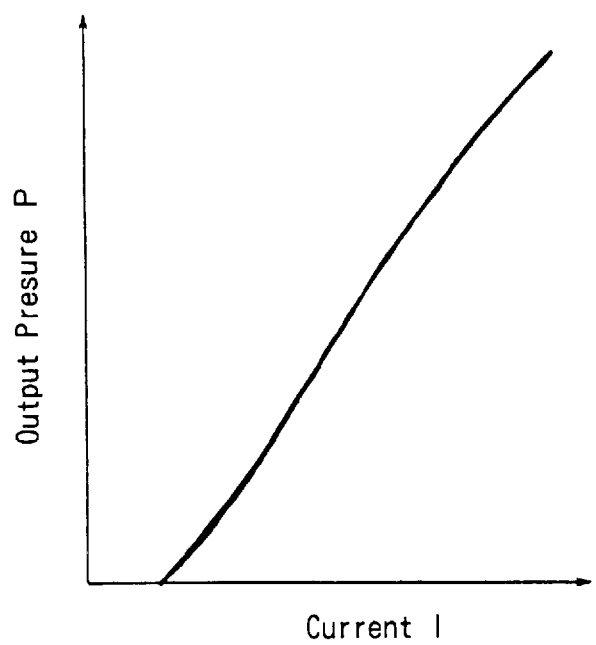
FIG. 8 is a diagram illustrating a relation between the current input to the electromagnetic unit and the output pressure of the pressure regulating valve of the first embodiment.

The plunger 22 and the push rod 21 are made axially movable through the hollow core by magnetic attraction to raise the output pressure as the electric input (or current) to the coil 23 increases, as shown in FIG. 8. On the right-hand end of the push rod 21, there is fixed the plunger 22 having a generally C-shaped longitudinal section as it confronts the hollow core 24. The push rod 21 has a generally T-shaped longitudinal section and is inserted coaxially in the hollow core 24 supported by a ball bearing.

Figure 3:
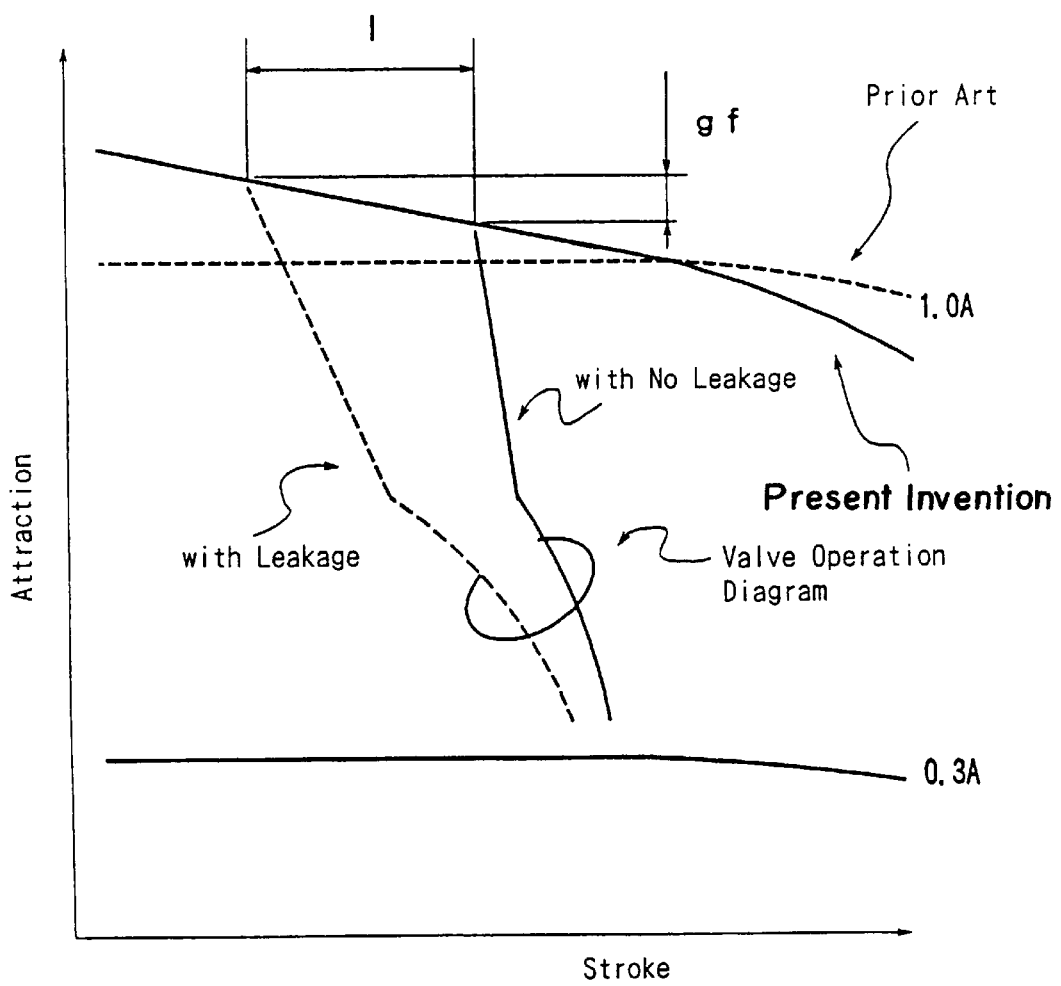
FIG. 3 is a diagram illustrating the stroke—magnetic attraction characteristics of an electromagnetic unit of the first embodiment.
Figure 4:
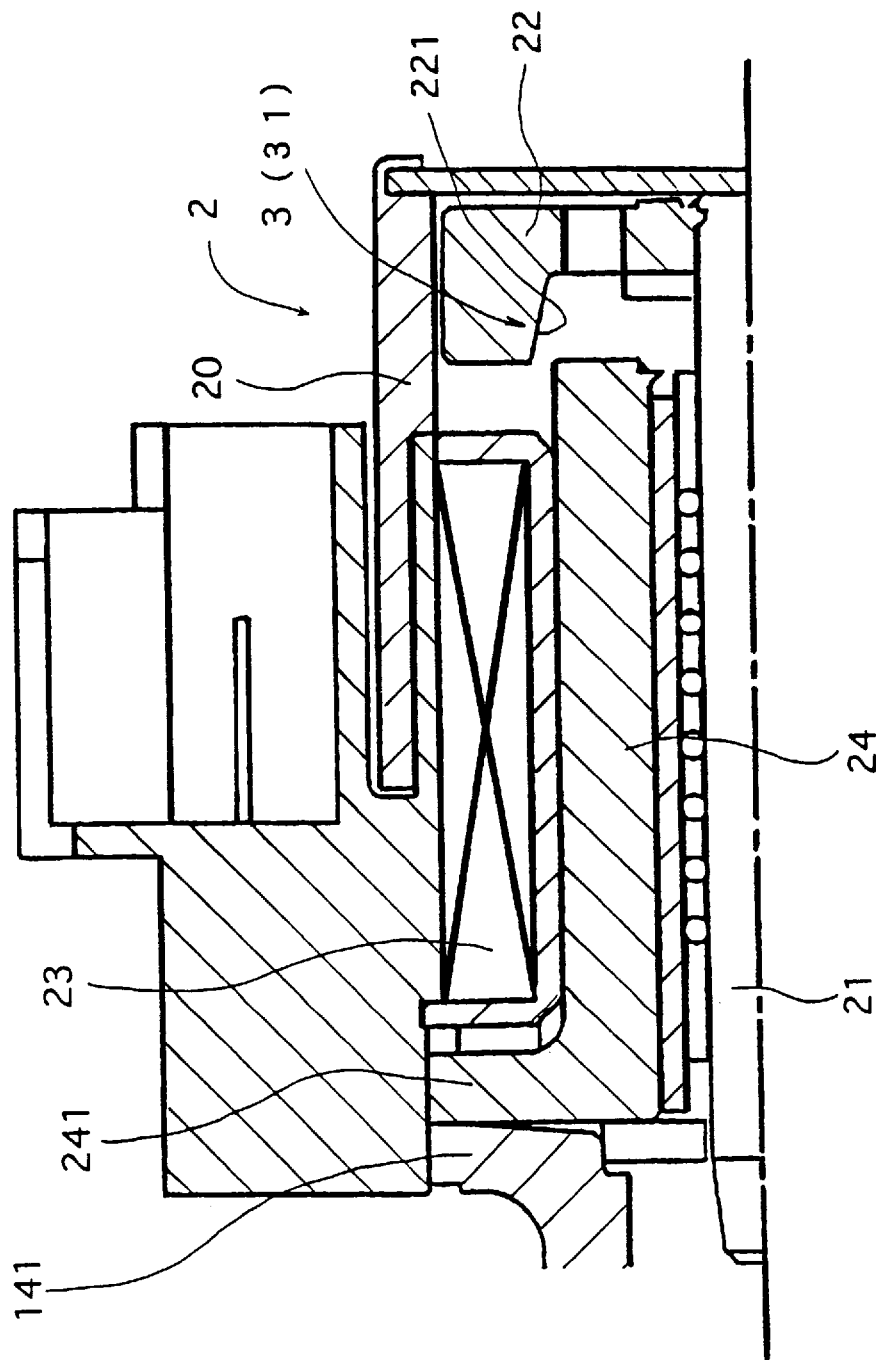
FIG. 4 is an enlarged sectional view showing attraction means in the pressure regulating valve of the first embodiment.
Figure 5:
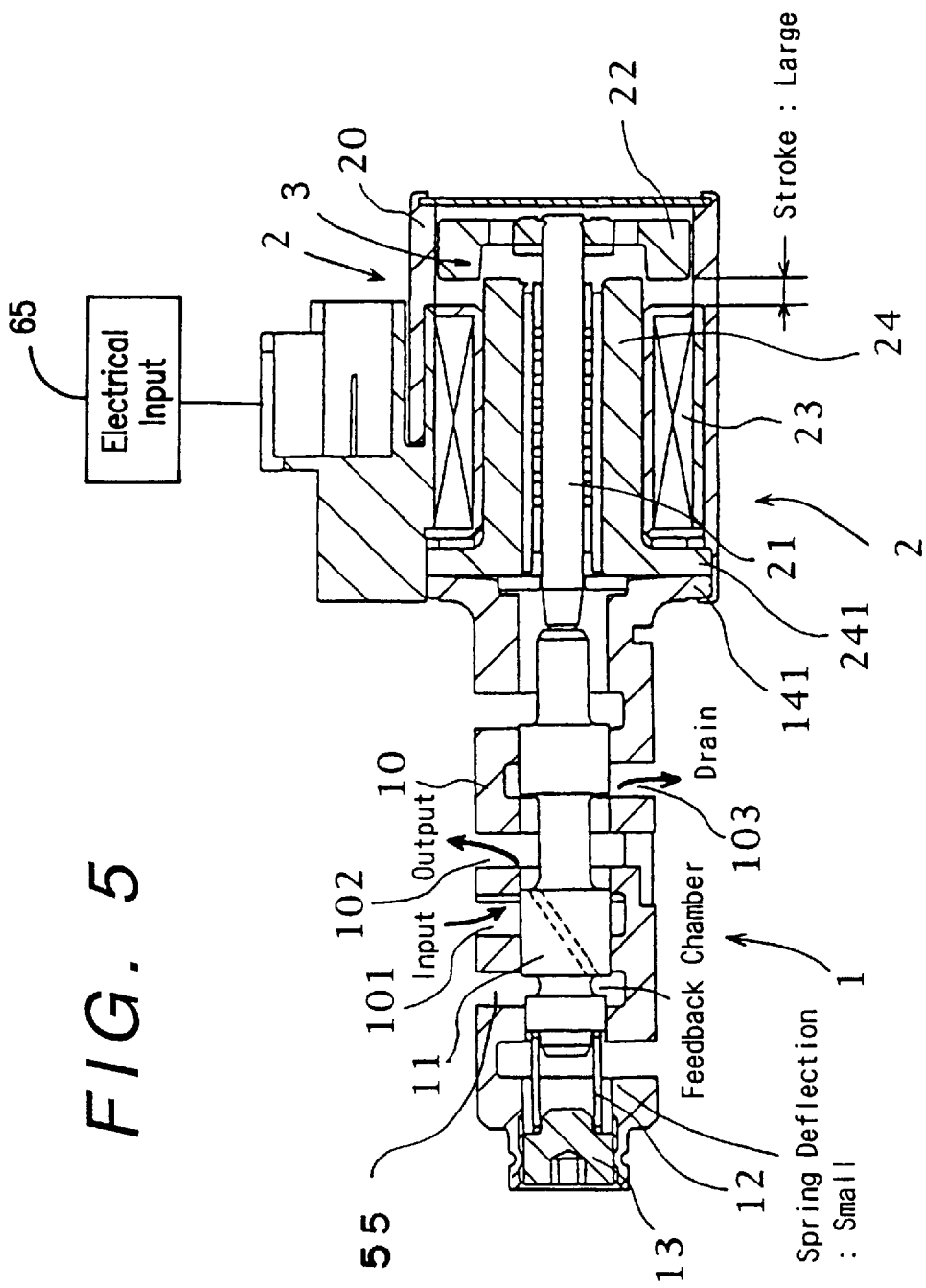
FIG. 5 is a sectional view showing an active state of the pressure regulating valve of the first embodiment.
Figure 6:
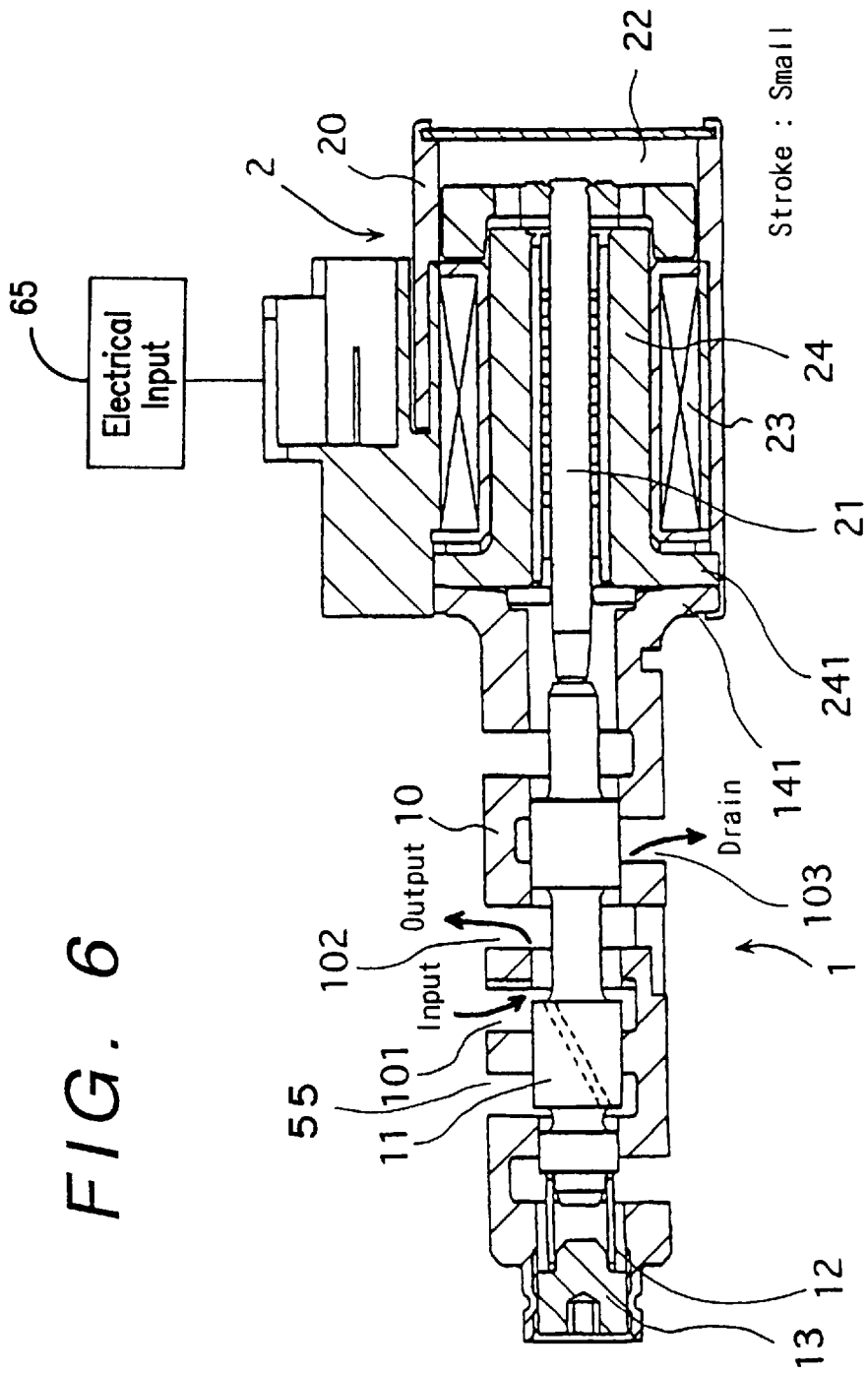
FIG. 6 is a sectional view showing the state in which is raised the output pressure of the pressure regulating valve of the first embodiment.
Figure 7:
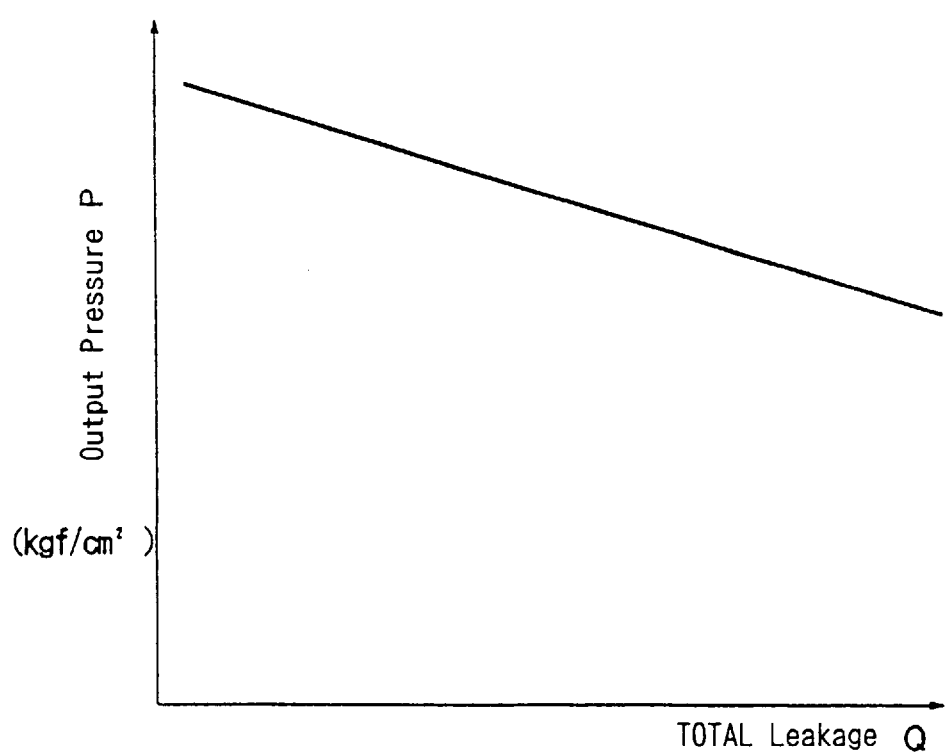
FIG. 7 is a diagram illustrating a relation between output pressure leakage and the output pressure of the pressure regulating valve of the first embodiment.

The spool moving mechanism 3 includes attraction means 31, including the hollow core (or stator) 24 and the plunger (or movable element) 22. Magnetic attraction between the plunger 22 and the core 24 causes linear motion of the spool 11 in a direction to increase the flow from the input port 101 to the output port 102 whet the output pressure supplied to the output pressure feedback port 55 is lowered by leakage. As shown in FIG. 4, the plunger 22 is provided with a tapered inner surface 221 on a flanged portion thereof. The tapered inner surface 221 causes a linear decrease in the electromagnetic attraction of the plunger 22 and the hollow core 24 as the stroke (or movement) of the plunger 22 increases, as shown in FIG. 3. The rate of change of the electromagnetic attraction to the stroke of the spool 11 is thus equalized to the rate of change of spring force accompanying the stroke of the spool.

The degree of opening of the input port 101 is determined according to the position of the spool 11 as determined by the balance among the load resulting from the magnetic attraction depending upon the electric input to the coil 23, the spring load of the spring 12, and the feedback load for the output pressure from the output port 102 to act upon the spool 11. The feed pressure is thus regulated to the output pressure according to the degree of opening.

Figure 2:
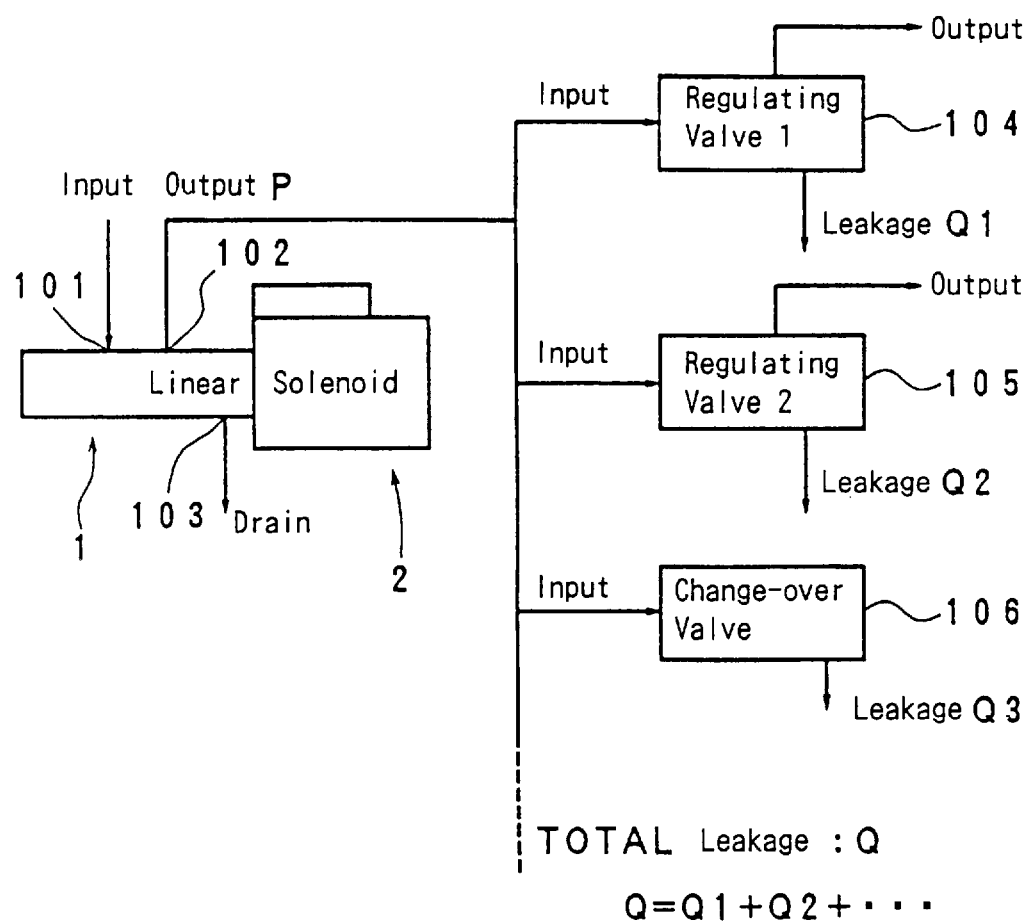
FIG. 2 is a block diagram showing a hydraulic control system of an automatic transmission, to which is applied the pressure regulating valve of the first embodiment.

As shown in FIG. 2, the output pressure thus regulated is fed from the output port 102 to the regulator valves 104 and 105 and the change-over valve 106 to control the application/release of the clutch or brake. Leakage of oil from the clearances between the valve sleeves and the spools of the regulator valves 104 and 105 and the change-over valve 106 is increased as heat is generated in the system causing thermal expansion of the pressure medium (or oil). Since the output pressure drops as the leakage increases (as shown, for example, in FIG. 7) the balance of the spring force, the output pressure feedback force, and the force supplied by the spool moving means is upset, tending to move the spool to the left of FIG. 9.

Advantageously, the attraction means 31 has a taper angle on the inner circumference 221 of the flanged portion of the plunger 22 such that the magnetic attraction between the plunger 22 and the hollow core 24 is decreased as the stroke of the plunger 22 increases. Specifically, due to the taper angle, the rate of change of the electromagnetic attraction of the electromagnetic unit 2 to the stroke is regulated to the rate of change of the spring force accompanying the movement of the spool. The hollow core (or stator) 24 attracts the plunger (or movable element) 22 in a direction to increase the flow from the input port 101 to the output port 102. The spool 11 is thereby moved from the position shown in FIG. 5 to the position shown in FIG. 6. Thus, the balance among the spring force of the spring 12 fitted in the valve sleeve 10, the feedback force for the output pressure outputted from the output port 102 to act upon the spool 11, and the electromagnetic attraction generated in response to the electric signal inputted to the electromagnetic unit 2 is changed to raise the output pressure.

Accordingly, a first embodiment of the valve according to present invention includes a spool moving mechanism 3 for moving the spool 11 to increase the flow from the input port 101 to the output port 102. When output pressure of the valve is lowered by leakage, a hollow core (or stator) 24 constructing the attraction means 31 of the spool moving mechanism is enabled to move the spool 11 automatically in a direction to increase the flow from the input port 101 to the output port 102 by attracting a plunger (or movable element) 22 having the predetermined taper angle on an inner circumference 221 of a flanged portion thereof. The magnetic attraction between the plunger 22 having the tapered inner circumference 221 and the hollow core 24 is linearly lowered as the spool 1 stroke increases. Advantageously, the valve is of a simple, compact and low cost design which can simultaneously raise output pressure in response to leakage thereby preventing associated problems such as shift shock.

Figure 9:
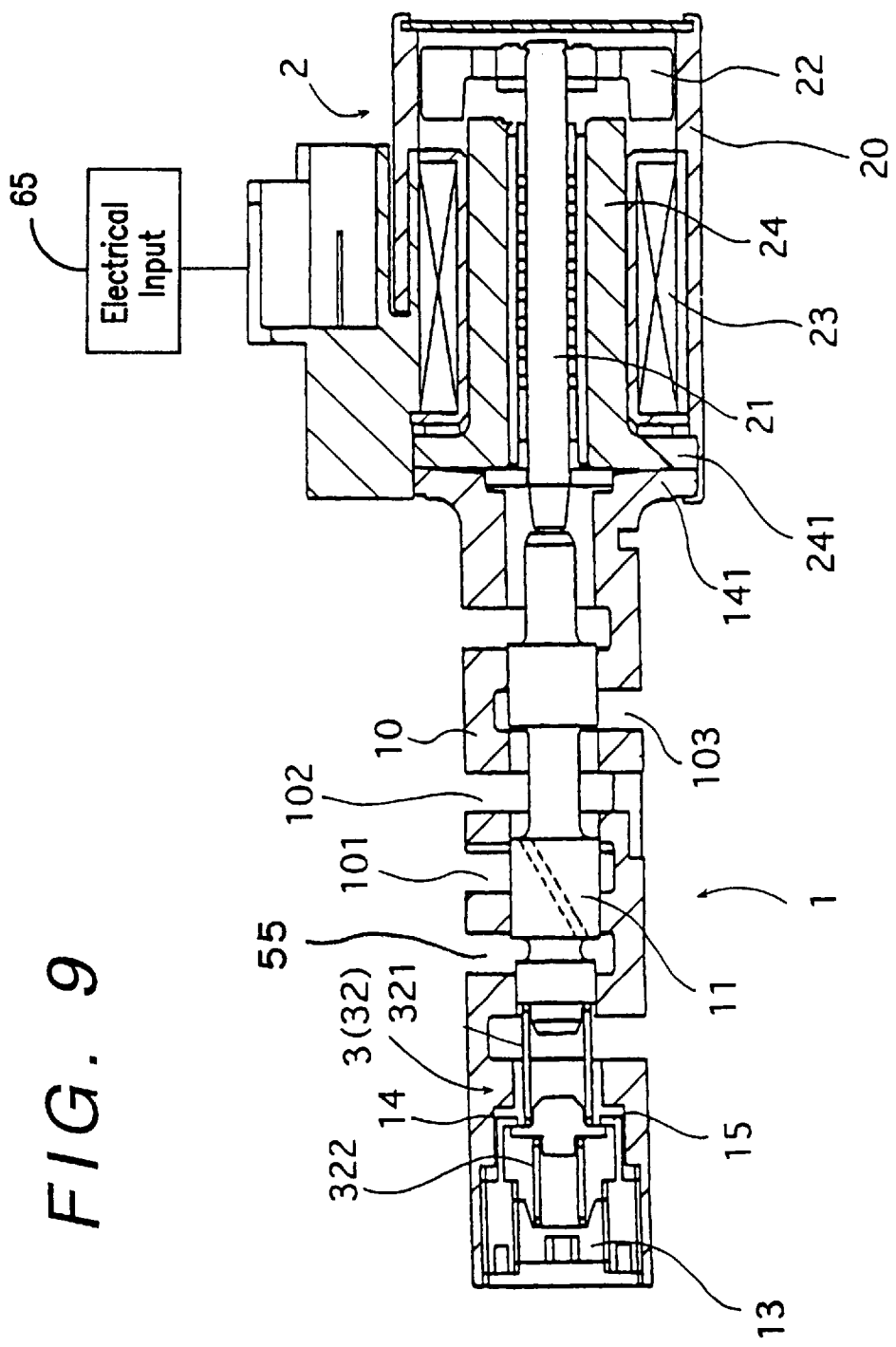
FIG. 9 is a side sectional view showing a pressure regulating valve according to a second embodiment of the present invention.
Figure 10:
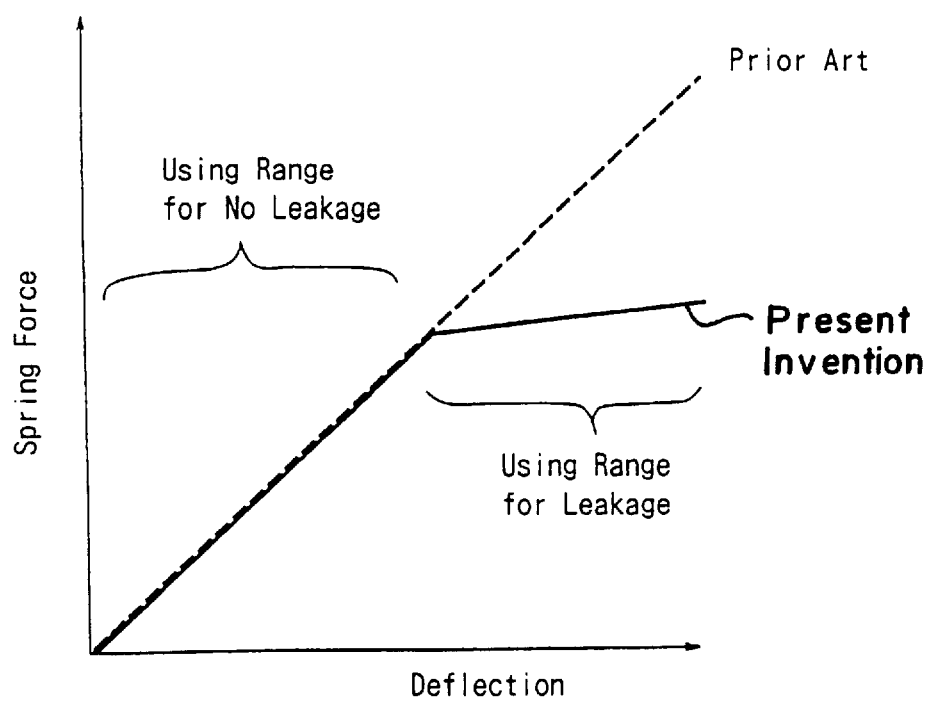
FIG. 10 is a diagram illustrating a relation between the deflection and force of a spring in the pressure regulating valve of the second embodiment.

With reference now to FIGS. 9 and 10, a second embodiment of a pressure regulating valve according to the present invention differs from that of the first embodiment in that the spool moving mechanism 3 is constructed of spring means 32 having non-linear characteristics for urging the spool. Other features of the second embodiment are common to those of the first embodiment. Reference is made to the description provided above for such common positions.

As shown in FIG. 9, the spring means 32 is mounted between a receiving plug 13 fitted in one end of the valve sleeve 10 and the spool 11 to urge the spool 11 rightward of FIG. 9. The spring means 32 includes a first spring 321 mounted between one end of the spool 11 and an intermediate member 14. The intermediate member is retained by a stopper 15 positioned within the receiving plug 13. A second spring 322 is mounted between the receiving plug 13 and the intermediate member 14.

The first spring 321 and the second spring 322, are thus arranged in series to provide a non-linear spring constant for the spring means 32. As shown in FIG. 10, the spring means 32 has a large spring constant until a spring load deflection constant corresponding to the using range for no leakage is reached, and a small spring constant when a deflection constant corresponding to a using range for leakage is exceeded. The intermediate member 14 is initially retained by the stopper under a constant spring load from second spring 332, allowing only the first spring 321 to deflect. When the constant spring load is exceeded, the retained state of the intermediate member 14 by the stopper is released to deflect both the first and second springs 321 and 322.

In operation, the spool 11 is moved leftward of FIG. 9 by magnetic attraction, and the intermediate member 14 is retained by the stopper until the spring load deflection constant is reached so that only the first spring 321 is deflected in the shrinking direction. When output pressure drops due to leakage, the spring load deflection constant and the output pressure feedback load are exceeded by the load provided by the spool moving mechanism 3. In the range exceeding the deflection constant for the leakage, the retained state of the intermediate member 14 by the stopper is released so that both the first and second springs 321 and 322 are deflected with the small spring constants. As a result, the output pressure is raised by movement of the spool 11 in a direction to increase the flow from the input port 101 to the output port 102.

Movement of the spool 11 is thus allowed by the non-linear characteristics of the spring means 32 when the output pressure is lowered by the leakage. With this simple construction, the output pressure is raised, while being prevented from any change without any external control, so that the pressure oil is fed to the individual valve means to prevent shift shock accompanying a drop in output pressure.

Figure 11:
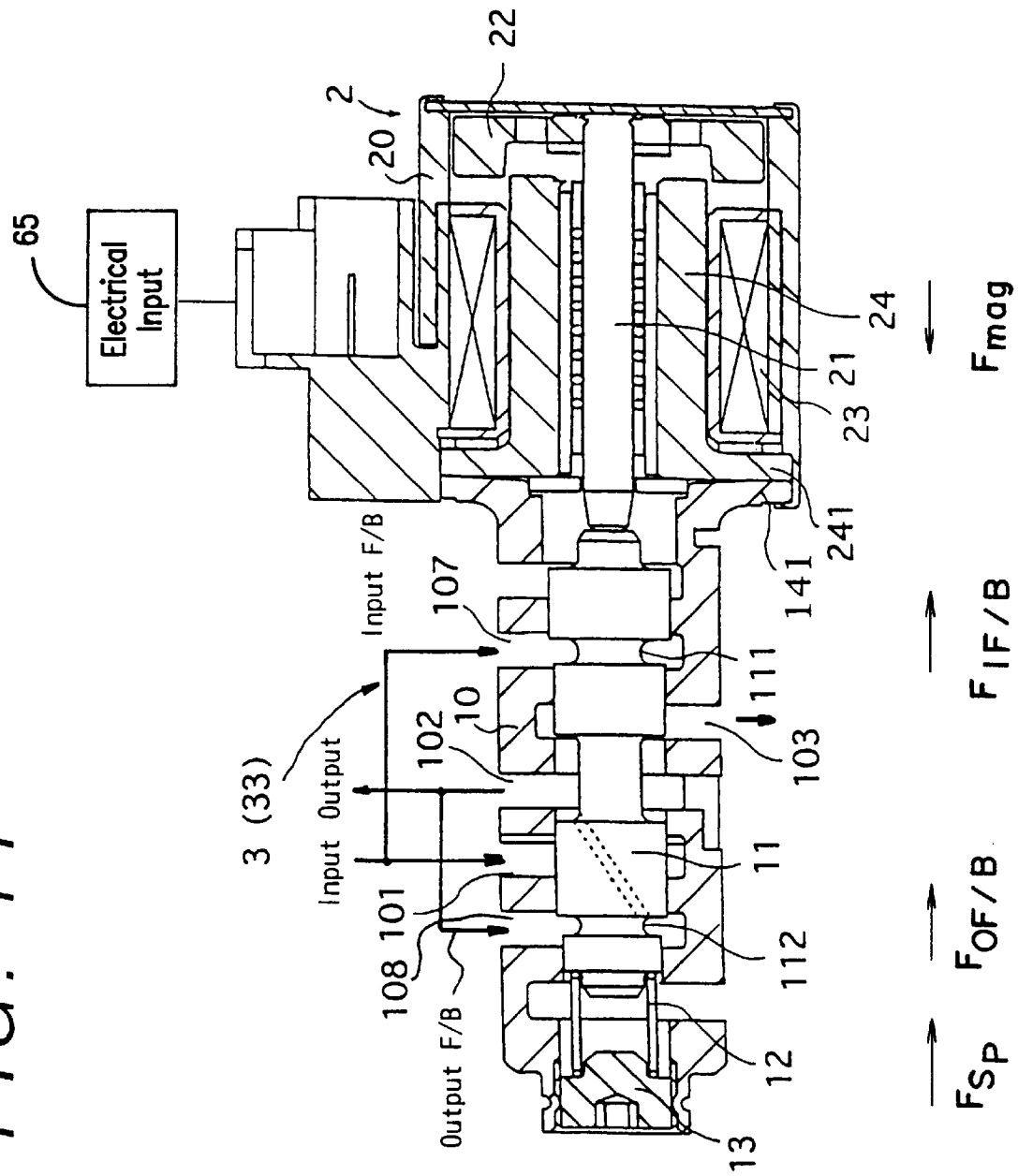
FIG. 11 is a side sectional view showing a pressure regulating valve according to a third embodiment of the present invention.
Figure 12:
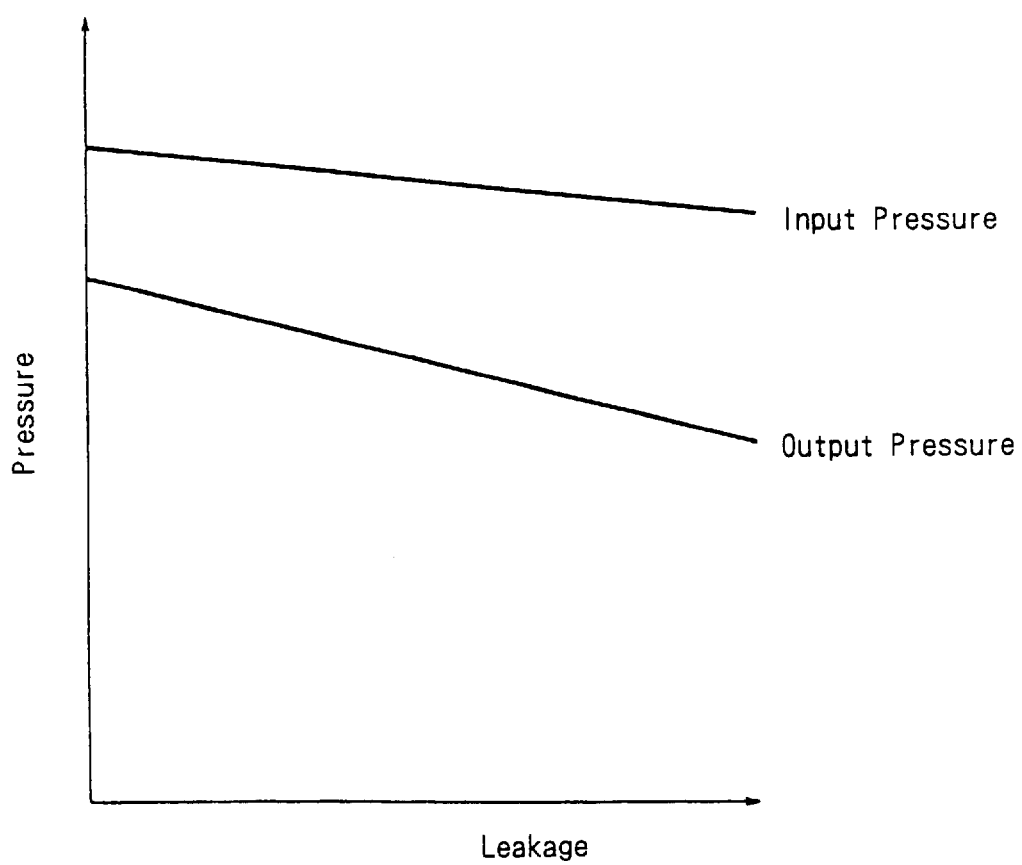
FIG. 12 is a diagram illustrating leakage and input and output pressures of the pressure regulating valve of the third embodiment.

A third embodiment of the present invention is shown in FIGS. 11 and 12. The spool moving mechanism 3 of the third embodiment is constructed of the input pressure moving means 33 including: an input pressure feed back port 107 formed in the valve sleeve 10; and a smaller-diameter stepped portion 111 formed in the spool 11 to apply the input pressure fed to the input port 101 to a position corresponding to the input pressure feedback port 107. The input pressure moving means 33 moves the spool 11 by making use of the input pressure feedback force resulting from the input pressure. The pressure regulating valve controls the spool to control the output pressure in accordance with the balance among the spring load of the spring 12, the input feedback load, the output pressure feedback load and the load according to the electrical signal. Other features of the third embodiment are identical to those of the first embodiment. Reference is made to the description provided above concerning such features.

As shown in FIG. 11, the valve sleeve 10, in which is fitted the spool 11, is formed to have the input pressure feedback port 107 communicating with the input port 101, and an output feedback port 108 communicating with the output port 102. First and second smaller-diameter stepped portions 111 and 112 are formed in the spool 11. These stepped portions 111, 112, are positioned to correspond to the input pressure and output pressure feedback ports 107 and 108, respectively, for applying the input pressure and the output pressure.

When the output pressure is lowered by leakage, the output pressure to be applied through the output pressure feedback port 108 and to the second stepped portion 112 drops. The input pressure to be applied through the input pressure feedback port 107 and the first stepped portion 111 also drops when the output pressure is lowered by the leakage, as shown in FIG. 12. As a result, the spool 11 is moved leftward of FIG. 11 by applying the input pressure feedback force to the spool 11, thereby increasing the flow from the input port 101 to the output port 102 to raise the output pressure.

The input pressure moving means 33 includes the input pressure feedback port 107 and the smaller-diameter stepped portion 111 formed in the spool 11 at the position corresponding to the input pressure feedback port 107, and moves the spool 11 by making use of the input pressure feedback force when the output pressure is lowered by leakage. Compared to the first embodiment, compensation for a drop in output pressure is achieved merely by changing the designs of the spool 11 and the valve sleeve 10, but by requiring no additional component such as external control or new parts. Pressure oil can thus be fed to the individual valve means under predetermined pressure to prevent shift shock accompanying a drop in the output pressure.

The embodiments which have been described herein are but some of the several which utilize this invention and are set forth here by way of illustration, but not of limitation. It is obvious that many other embodiments which will be readily apparent to those skilled in the art may be made without materially departing from the spirit and scope of this invention.

Figure 13:
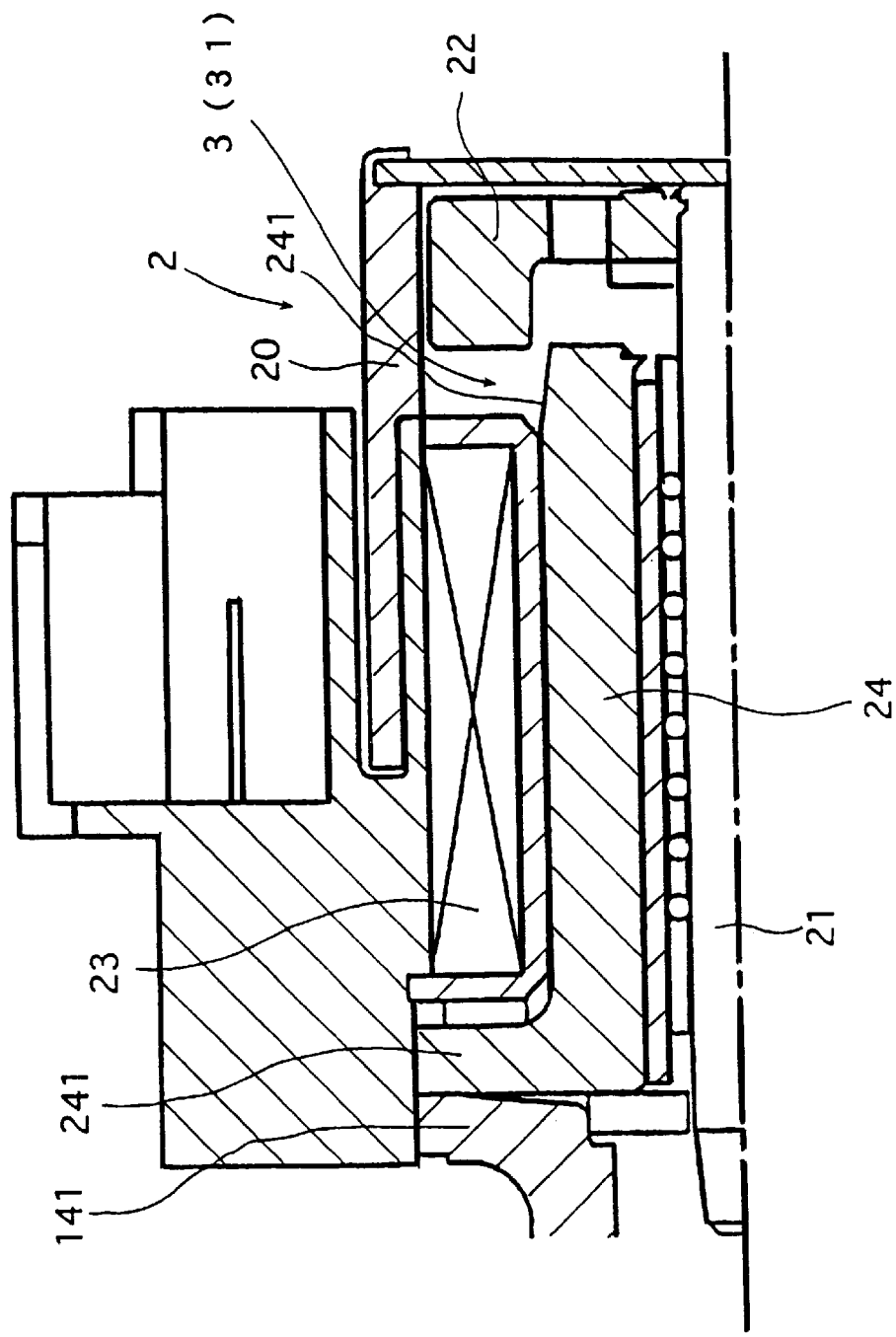
FIG. 13 is an enlarged sectional view showing another attraction means in the pressure regulating valve of the first embodiment.

For example, the first embodiment is exemplified by adjusting the taper angle of the inner circumference 221 of the flanged portion of the plunger 22 to equalize the rate of change of the magnetic attraction resulting from the movement of the spool 11 to the change of rate of the spring force accompanying the movement of the spool 11. Stroke—attraction characteristics in which the magnetic attraction linearly drops as the stroke (or movement) increase are thus realized. However, the attraction means for realizing the stroke—attraction characteristics could be constructed by giving a taper angle of a different diameter to the outer circumference 241 at the right-hand end of the hollow core 24, as shown in FIG. 13.

Figure 14A:
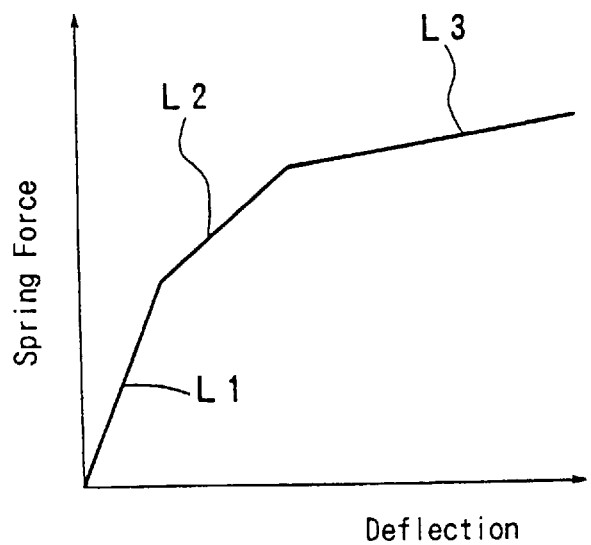
FIGS. 14A and 14B are diagrams illustrating non-linear characteristics of two other modes in broken and parabolic curves of a non-linear spring means according to the present invention.
Figure 14B:
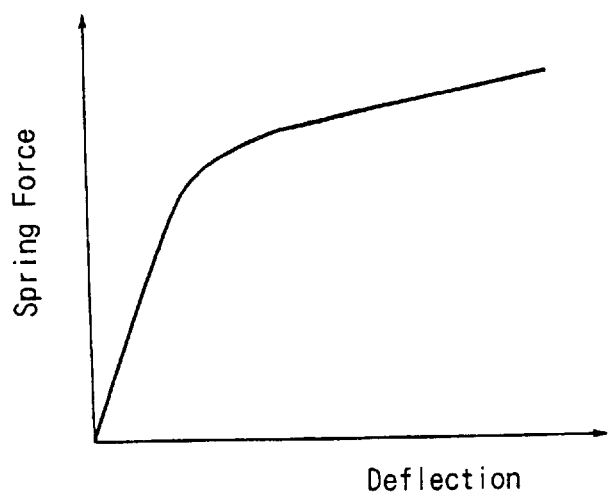
Figure 15:
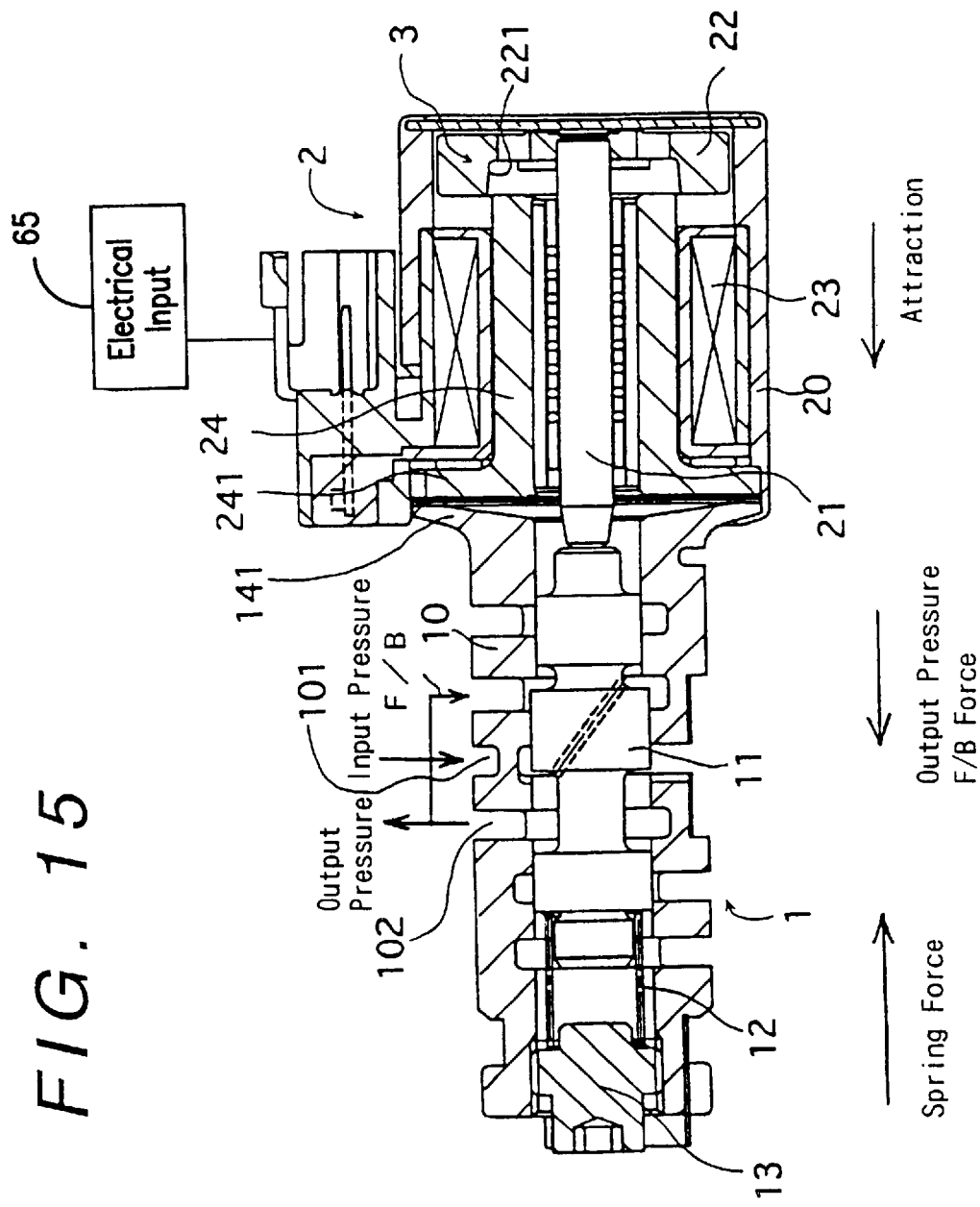
FIG. 15 is a side sectional view showing another pressure regulating valve according to the first embodiment of the present invention.
Figure 16:
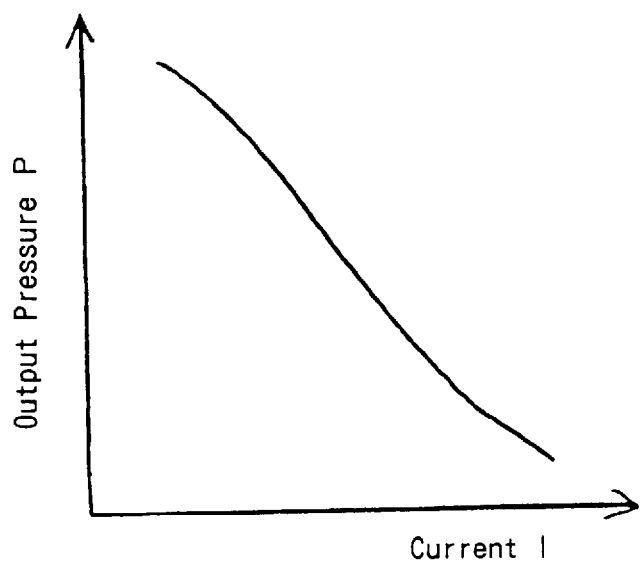
FIG. 16 is a diagram illustrating a relation between the current input to the electromagnetic unit and the output pressure of another pressure regulating valve of the first embodiment.

Also, the second embodiment is exemplified such that non-linear characteristics of FIG. 10 are realized by arranging the two springs in series. However the invention could adopt complex spring means, for realizing characteristics composed of three straight lines L1 to L3 and a parabolic curve, as illustrated in FIGS. 14(A) and 14(B). In addition, the above-described valves could be modified, as shown in FIGS. 15, 17 and 19, and to provide lowering current—output characteristics having a lowering output pressure as the electric signal (or current) increases, as shown in FIG. 16.

Figure 18:
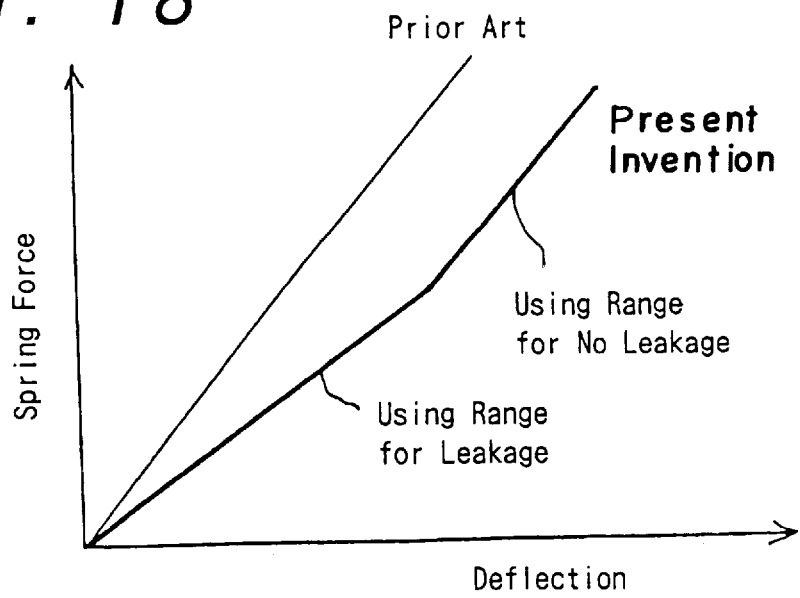
FIG. 18 is a diagram illustrating a relation between the deflection and force of a spring in another pressure regulating valve of the second embodiment.
Figure 17:
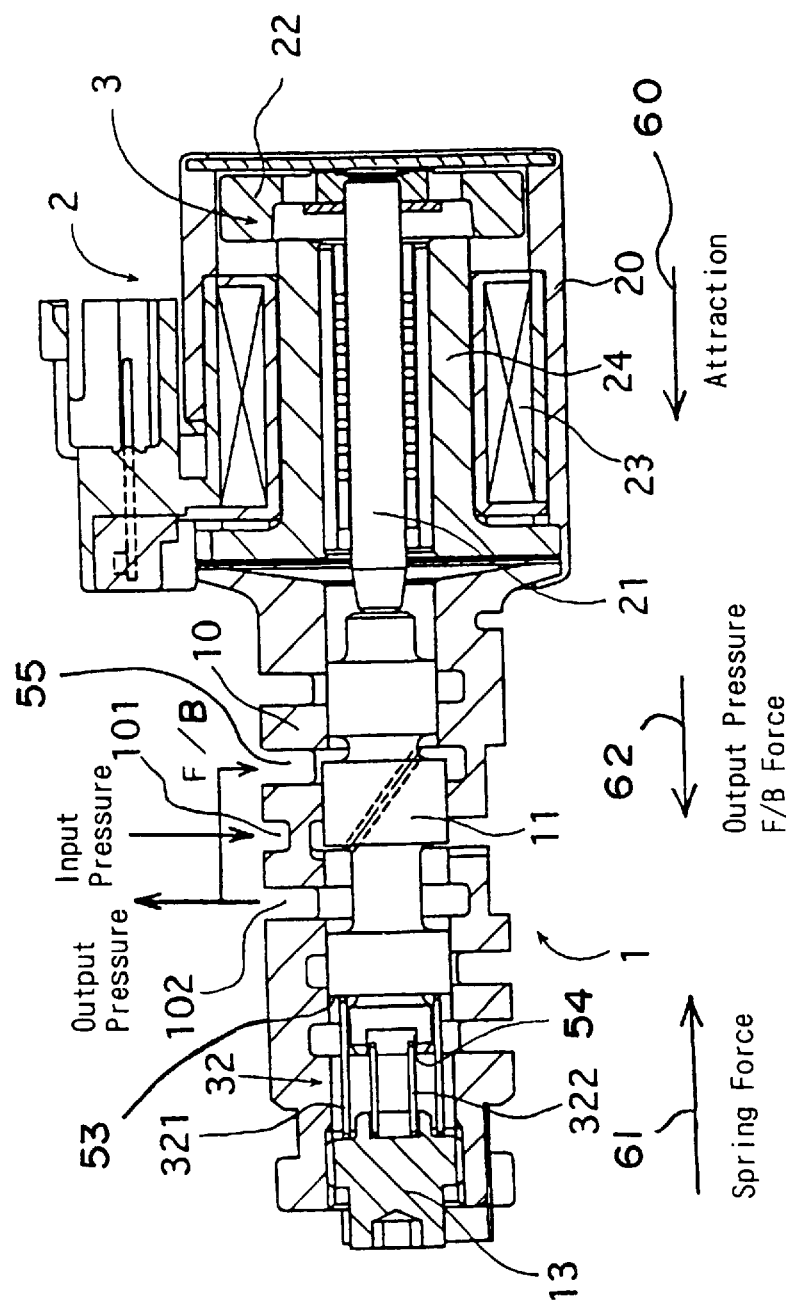
FIG. 17 is a side sectional view showing another pressure regulating valve according to the second embodiment of the present invention.

Other embodiments of the present invention which provide current—output pressure characteristics as in the second embodiment are shown in FIGS. 17 and 18. The spring means 32 is mounted, as shown in FIG. 17, between the receiving plug 13 fitted in one end of the valve sleeve 10, and the spool 11 so as to urge the spool 11 rightward of FIG. 17. The spring means 32 is constructed to include the first spring 321 mounted between the outer side 53 of one end of the spool 11 and the receiving plug 13. The second spring 322 is mounted between the inner side 54 of one end of the spool 11 and the receiving plug 13.

The first spring 321 and the second spring 322, are thus arranged in parallel, to provide a non-linear spring constant for the spring means 32. The spring constant is set at a small value for a deflection constant corresponding to a using range for the leakage, and at a large value for the deflection constant corresponding to the using range for no leakage. Thus, in the range with leakage, the spool 11 is moved leftward of FIG. 17 by the feedback force resulting from the magnetic attraction and the output pressure so that only the first spring 321 is deflected in the shrinking direction. In the range with no leakage and over the constant spring load, both the first and second springs 321 and 322 are deflected with the large spring constants. Thus, the output pressure is raised by moving the spool 11 in the direction to increase the flow from the input port 101 to the output port 102.

Figure 19:
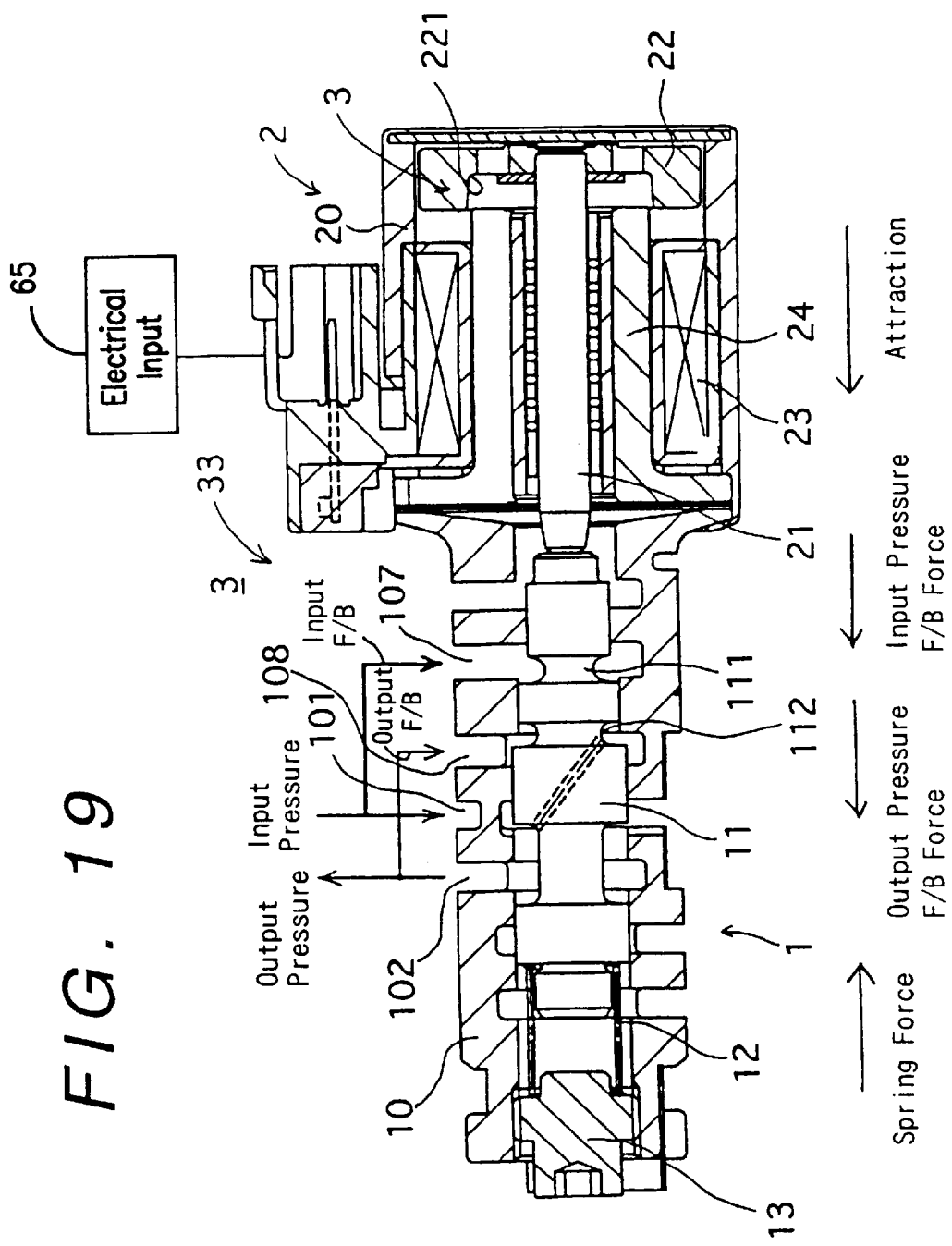
FIG. 19 is a side sectional view showing another pressure regulating valve according to the third embodiment of the present invention.
Figure 20:
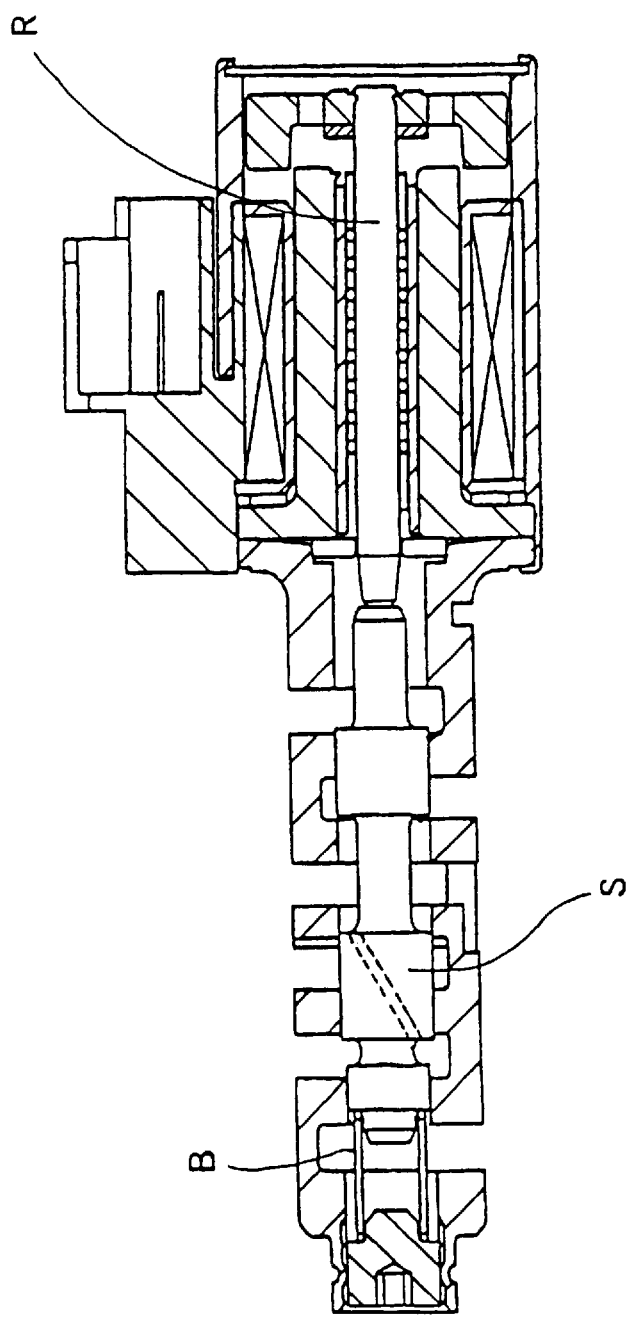
FIG. 20 is a section showing the pressure regulating valve of the prior art.

Thus, in a pressure regulating valve which has the increasing current—output pressure characteristics, as shown in FIG. 19, the spool 11 is moved rightward of FIG. 19 by applying the input pressure feedback force to the spool 11 so that the flow from the input port 101 to the output port 102 is increased to raise the output pressure.

According to the present invention, when the output pressure is lowered by leakage the spool position is controlled by the spool moving mechanism to raise the output pressure by moving the spool in the direction to increase the flow from the input port to the output port thereby to raise the output pressure.

In the one embodiment of the present invention, when the output pressure is lowered by a leakage, the stator composing an attraction means attracts a movable element to equalize the rate of change of the electromagnetic attraction accompanying the movement of the spool to the rate of change of the spring force accompanying the movement of the spool so that the spool is automatically moved in the direction to increase the flow from the input port to the output port thereby to raise the output pressure. Thus, it is needless to increase the size of the pressure regulating valve and to improve other devices while solving the shift shock accompanying the drop in the output pressure and other problems.

In another embodiment of the present invention, when the output pressure is lowered by leakage, movement of the spool is allowed by the non-linear characteristics of the spring means. The movement of the spool to compensate for leakage is allowed because the spring constant of the spring means is set at a small value corresponding to a displacement range for leakage. Thus, shift shock accompanying the drop in the output pressure is prevented without any external control by the simple construction.

In a further embodiment of the present invention, when the output pressure is lowered by leakage, the input pressure moving means, as composed of the input pressure feed back port formed in the valve sleeve and the smaller-diameter stepped portion formed in the spool at the position corresponding to the input pressure feedback port, moves the spool by making use of the input pressure feedback pressure. Thus, shift shock accompanying the drop in the output pressure is prevented with neither any external control nor any additional construction.

What is claimed is:

1. A pressure regulating valve for use in a hydraulic control system of a vehicular automatic transmission, said pressure regulating valve comprising:

a valve sleeve having an input port for receiving an input pressure, an output port for output of a regulated pressure, and feedback means for generating a feedback force, said feedback means including a first feedback port for receiving said regulated pressure as a first feedback pressure;

a valve spool slidably mounted within said valve sleeve for throttling the input pressure and for moving in response to changes in said feedback force generated by said feedback means to produce said regulated pressure;

spring means, including at least one spring element mounted within said valve sleeve, for biasing said valve spool with a spring force in a first direction relative to said valve sleeve;

an electromagnetic unit for biasing said valve spool with an electromagnetic force in a second direction relative to said valve sleeve, opposite said first direction to select an output pressure for said output port, said electromagnetic unit comprising:

a push rod mounted within said electromagnetic unit and abutting said valve spool for sliding movement responsive to said electromagnetic force, said valve spool being positionable within said valve sleeve by said push rod, and a coil surrounding said push rod for generating said electromagnetic force responsive to a current input to said coil; and leakage compensating means for providing a rate of change of one of said forces equal to a rate of change in said spring force during movement of said valve spool by said feedback means to increase flow from said input port to said output port responsive to a decrease in said regulated pressure due to leakage, thereby maintaining said forces operating on said valve spool in balance.

2. A pressure regulating valve according to claim 1 wherein said feedback force includes a force generated by said first feedback pressure operating on said valve spool in said first direction, and said leakage compensating means has a rate of change in said one force equal to a rate of increase in said spring force resulting from movement of said valve spool by said feedback means.

3. A pressure regulating valve according to claim 1 wherein said feedback force includes a force generated by said first feedback pressure operating on said valve spool in said second direction.

4. A pressure regulating valve according to claim 1 wherein said electromagnetic unit further comprises:

a hollow core mounted within said coil with said push rod mounted within a hollow of said hollow core for sliding movement; and a cup-shaped plunger including a base fixed to one end of said push rod and a cylindrical wall extending from said base toward said core, said cylindrical wall having an inner cylindrical surface defining an open interior for receiving one end of said core, said inner cylindrical surface being tapered to form said leakage compensating means in combination with said core so as to provide a rate of change in said electromagnetic force equal to the rate of change in said spring force resulting from movement of said valve spool by said feedback means.

5. A pressure regulating valve according to claim 4 wherein said said rate of change of said leakage compensating means increases by said rate of change said electromagnetic force equal to an increase in said spring force resulting from movement of said valve spool by said feedback means responding to increasing leakage.

6. A pressure regulating valve according to claim 1, said valve further comprising a receiving plug positioned at an end of said valve sleeve opposite from said electromagnetic unit, and wherein said spring means comprises:

an intermediate member retained within said valve sleeve by a topper positioned within said receiving plug;

a first spring mounted between an end of said valve spool and said intermediate member; and a second spring mounted between said receiving plug and said intermediate member, said first and second springs forming said leakage compensating means in combination with said receiving plug, said intermediate member and said stopper.

7. A pressure regulating valve according to claim 1, said valve further comprising a receiving plug position at an end of said valve sleeve opposite from said electromagnetic unit, and wherein said spring means comprises:

a first spring mounted between an outer portion of one end of said valve spool and said receiving plug; and a second spring mounted between an inner portion of said one end of said valve spool and said receiving plug, said first and second springs forming said leakage compensating means in combination with said receiving plug.

8. A pressure regulating valve according to claim 1 wherein said feedback means further comprises:

a second feedback port formed in said valve sleeve for receiving said input pressure as a second feedback pressure, said second feedback port being positioned adjacent a reduced-diameter stepped portion formed in said valve spool to form said leakage compensating means.

* * * * *